April 8, 1969 J. S. DIX 3,437,654
AZIRIDINE PRODUCTION
Original Filed May 20, 1963
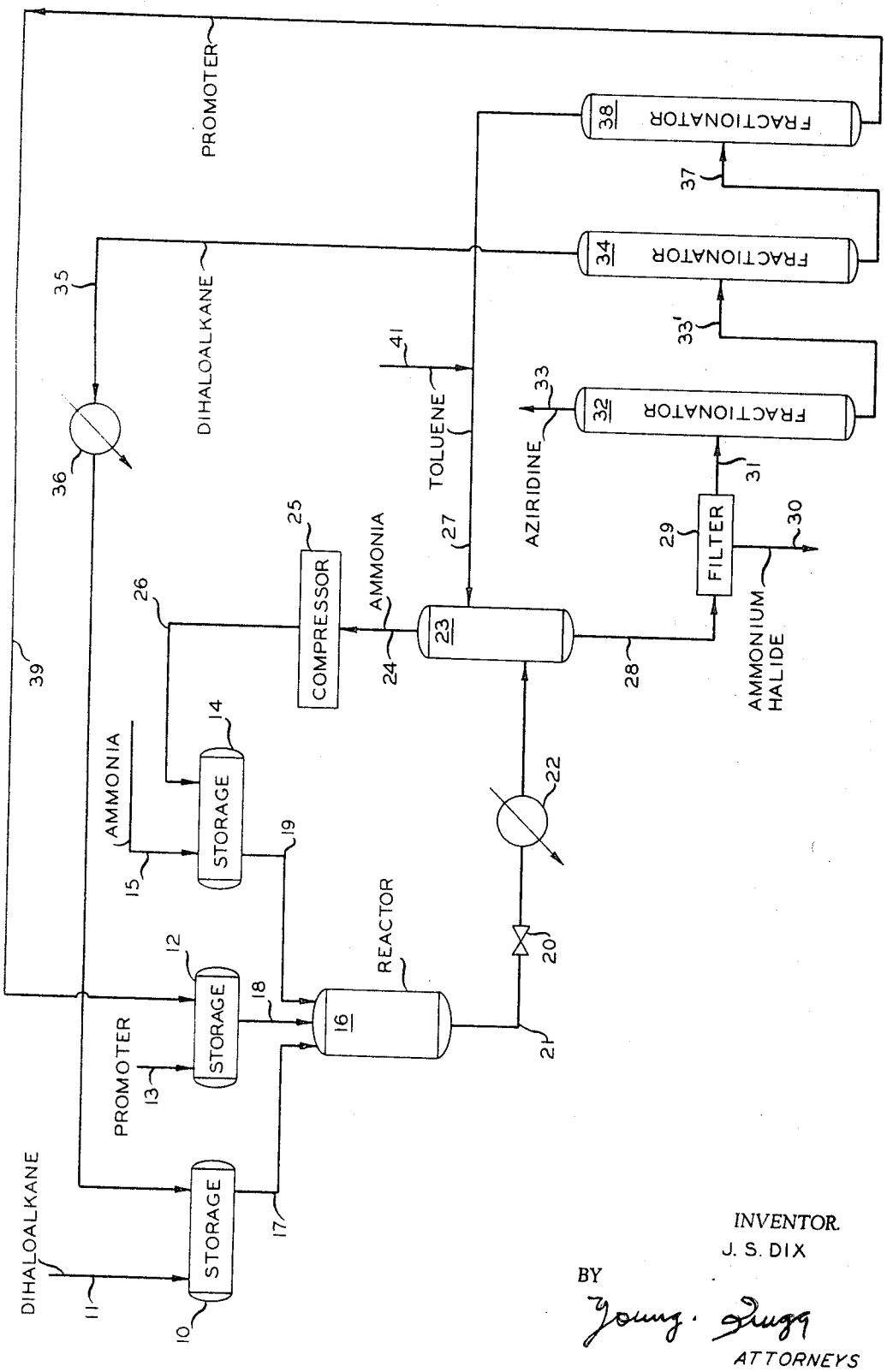
INVENTOR.
J. S. DIX
BY
Young. Quigg
ATTORNEYS

United States Patent Office 3,437,654
Patented Apr. 8, 1969

3,437,654
AZIRIDINE PRODUCTION
James S. Dix, Bartlesville, Okla., assignor to Phillips Petroleum Company, a corporation of Delaware
Original application May 20, 1963, Ser. No. 281,691, now Patent No. 3,205,224, dated Sept. 7, 1965. Divided and this application June 18, 1965, Ser. No. 465,072
Int. Cl. C07d 23/04, 23/02
U.S. Cl. 260—239
7 Claims

ABSTRACT OF THE DISCLOSURE

Aziridines are produced by reacting ammonia with 1,2-dichloroethane, 1,2-dibromoethane, 1,2-dichloropropane, 1,2-dibromopropane, 1-chloro-2-bromoethane, 1-bromo-2-chloropropane or 1-chloro-2-bromopropane in the presence of a liquid organic polar compound of the formula

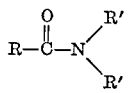

where R is hydrogen or alkyl, R' is alkyl, with the total number of carbon atoms being a maximum of 8.

---

This is a division of copending application Ser. No. 281,691, filed May 20, 1963, now U.S. Patent 3,205,224.

This invention relates to the production of ethylenimine and propylenimine.

In recent years, a considerable market has developed for low molecular weight imines such as ethylenimine and propylenimine. For example, large amounts of ethylenimine are employed to form certain aziridinyl-substituted phosphine compounds which are employed in the cross linking of cellulosic materials to give fibers a permanent set. Such a process is widely used in the manufacture of clothing having "drip dry" characteristics.

In accordance with this invention, an improved process is provided for the production of ethylenimine and propylenimine. These compounds are prepared by reacting ammonia with 1,2-dichloroethane, 1,2-dibromoethane, 1,2-dichloropropane, 1,2-dibromopropane, 1-chloro-2-bromoethane, 1-bromo-2-chloropropane, or 1-chloro-2-bromopropane. The reaction is carried out in the presence of a promoter which comprises a liquid organic polar compound of the formula

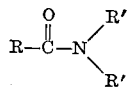

where R is hydrogen or alkyl, R' is alkyl, with the total number of carbon atoms being a maximum of 8.

Accordingly, it is an object of this invention to provide a novel process for the preparation of low molecular weight aziridines.

Another object is to provide an economical process for producing low molecular weight aziridines in high yields with the minimum formation of undesirable byproducts.

Other objects, advantages and features of the invention should become apparent from the following detailed description, taken in conjunction with the accompanying drawing which is a schematic representation of a process for the preparation and recovery of aziridines in accordance with the invention.

The reaction of this invention is advantageously carried out in the liquid phase. Accordingly, temperatures above the critical temperature of ammonia (132° C.) should not be used. The reaction temperature is advantageously in the range of 25 to 110° C. The pressure in the reaction zone can vary over quite a wide range, and is usually the autogenous pressure developed by the reaction mixture at the selected reaction temperature. Of course, higher pressures can be employed if desired. One method of obtaining higher pressures is by the use of inert gases such as nitrogen in the raction zone. The mol ratio of ammonia to the dihaloalkane is generally in the range of 20:1 to 150:1, preferably in the range of 75:1 to 150:1. Within these ranges, the high ratios generally are employed when lesser amounts of promoter are used and vice versa. The reaction time is generally in the range of 10 minutes to 2 hours, although times outside this range can be used, particularly times less than 10 minutes.

The reaction is carried out in the presence of a liquid organic polar compound of the class previously defined. Examples of such compounds include dimethylformamide, dimethylacetamide, and N,N-diethylbutyramide. The concentration of these polar organic solvents in the reaction zone is generally in the range of from 5 to 50 percent by weight of the total reaction mixture (ammonia plus dihaloalkane). Of course, mixtures of these various promoters can also be employed.

Referring now to the drawing in detail, there is shown a process which can be employed to advantage in the production and recovery of aziridines. The dihaloalkane is introduced into a storage vessel 10 by means of a conduit 11. The promoter is introduced into a storage vessel 12 by means of a conduit 13. Ammonia is introduced into a storage vessel 14 through a conduit 15. These three materials are introduced from the respective storage vessels into a reactor 16 by means of respective conduits 17, 18 and 19. Reactor 16 should be designed so as to provide the desired residence time. The reactor normally is provided with a heating jacket, not shown, to maintain the desired reactor temperature. Since a relatively large amount of ammonia in the reactor is being maintained at an elevated temperature, liquid phase operation requires fairly high pressures within reactor 16. A valve 20 is provided in reactor outlet conduit 21 to reduce the pressure downstream of this valve to approximately atmospheric. The reactor effluent removed through conduit 21 is directed through a condenser 22 which condenses any ammonia that is vaporized in passage through valve 20. This assures that the reactor effluent introduced into a vessel 23 remains in the liquid phase. It is important that the ammonia be in the liquid phase at this time to dissolve any ammonium chloride or ammonium bromide that may be present. Otherwise, these materials could cause plugging of the conduits.

Vessel 23 provides a flash zone with the ammonia being removed overhead through a conduit 24. Conduit 24 communicates with the inlet of a compressor 25 which liquefies the flashed ammonia. The resulting liquid is returned to storage vessel 14 through a conduit 26. The reactor effluent is introduced into a body of a liquid hydrocarbon, such as toluene, which is maintained in vessel 23 at a temperature above the flash point of the ammonia at the existing pressure. This toluene is introduced through a conduit 27 from a source described hereinafter. As the ammonia flashes off from the reactor effluent, the ethylenimine or propylenimine and unconverted dihaloalkane dissolve in the toluene while the ammonium halide precipitates out. The toluene also serves to dilute the mixture and thus retard further reaction of the imine with the dihaloalkane. The resulting mixture in vessel 23 is removed through a conduit 28 which has a filter 29 therein. The ammonium halide is removed from the filtration zone through a suitable conveyor 30. The remainder of the reactor effluent plus the toluene is transferred through a conduit 31 to the inlet of a first fractionator 32. The aziridine product is removed as the overhead from fractionator 32 through a conduit 33. Unreacted dihaloalkane, toluene and liquid promoter are removed from the bottom of fractionator 32 through a conduit 33' which communicates with the inlet of a second fractionator 34. The dihaloalkane is removed from the top of fractionator 34 through a conduit 35 which has a condenser 36 therein. The condensed dihaloalkane is returned to storage vessel 10. The toluene and a liquid promoter boiling above toluene (if employed) are removed from the bottom of fractionator 34 through a conduit 37 which communicates with the inlet of a third fractionator 38. The toluene is removed from the top of fractionator 38 through conduit 27. The liquid promoter is removed from the bottom of fractionator 38 through a conduit 39 and returned to storage vessel 12. If the liquid promoter boils below toluene, such promoter is taken overhead from fractionator 38 instead of the toluene. Of course, other separation procedures, such as crystallization or solvent extraction, can be employed in place of the fractionator for certain materials.

It should be evident that the drawing is schematic, and that various control valves, pumps, and elements associated with the fractionators have been omitted for purposes of simplicity.

The following example contains runs which are representative of this invention:

Example

A series of runs was carried out in which 1,2-dichloroethane and ammonia were reacted either in the presence or absence of a polar organic promoter.

In each of these runs, an 800 ml. stainless steel bomb was charged with 11.1 grams of 1,2-dichloroethane and the specified amount of promoter, if a promoter was to be used. The bomb was sealed off and then cooled with Dry Ice-acetone, after which 204±10 grams of ammonia was charged to the bomb. Thus, the mol ratio of ammonia to 1,2-dichloroethane was approximately 100 to 1 in all runs. The contents of the bomb were then rapidly heated to the reaction temperature by immersing the bomb in a hot water bath. At the end of the reaction period, the reaction was quenched by placing the bomb in a quench bath. Ammonia was then vented through a gas scrubber containing toluene cooled with solid carbon dioxide. The ammonia which condensed in the scrubber was subsequently allowed to vaporize. Entrained ethylenimine remained in the toluene, and a small amount of 1,2-dichloroethane was also collected in the toluene. The material remaining in the bomb after venting the ammonia was recovered by evacuating the bomb to 1 mm. mercury absolute pressure, slowly heating the bomb to 100° C., and maintaining the bomb at that temperature for one hour. Volatile materials removed in this manner were condensed in a trap cooled by liquid nitrogen. The trapped material was then allowed to vaporize at room temperature and atmospheric pressure. The remaining liquid consisted of ethylenimine, 1,2-dichloroethane and small quantities of unidentified byproducts. Ethylenimine yield was determined by gas-liquid chromatographic analysis using a 10 foot column containing 6 percent Carbowax 20M on Haloport F packing. The analyses were carried out at 100° C. The ethylenimine contents of both the toluene solution and the material from the trap were determined by comparison of peak areas with those of standard solutions. The ethylene chloride conversion was calculated on the basis of ionic chloride determination of the residue in the bomb.

The results of these runs are expressed in the following table.

By comparing runs 2 and 3 with run 1, it can be seen that the use of dimethylformamide gave a higher conversion and a higher per pass yield of ethylenimine than when no promoter was used. A relatively high mol ratio of ammonia to 1,2-dichloroethane was employed in this example.

While this invention has been described in conjunction with presently preferred embodiments, it obviously is not limited thereto.

What is claimed is:

1. The method of producing an aziridine which comprises contacting ammonia with a compound selected from the group consisting of 1,2-dichloroethane, 1,2-dibromoethane, 1,2-dichloropropane, 1,2-dibromopropane, 1-chloro-2-bromoethane, 1-bromo-2-chloropropane and 1-chloro-2-bromopropane in the presence of a reaction promoter comprising a liquid organic polar compound of the formula

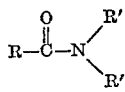

where R is hydrogen or alkyl, R' is alkyl, with the total number of carbon atoms being a maximum of 8, and recovering an aziridine thus produced.

2. The method of producing an aziridine which comprises contacting ammonia with a compound selected from the group consisting of 1,2-dichloroethane, 1,2-dibromoethane, 1,2-dichloropropane, 1,2-dibromopropane, 1-chloro-2-bromoethane, 1-bromo-2-chloropropane and 1-chloro-2-bromopropane in the presence of a reaction promoter comprising a liquid organic polar compound of the formula

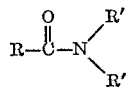

where R is hydrogen or alkyl, R' is alkyl, with the total number of carbon atoms being a maximum of 8, the mol ratio of ammonia to the compound being in the range of 75:1 to 150:1, the reaction temperature being less than 132° C., and the amount of promoter being from 5 to 50 weight percent of the total reactants; and recovering an aziridine thus produced.

3. The method of claim 2 wherein the compound is 1,2-dichloroethane, and the promoter is dimethylformamide.

4. The method of producing an aziridine which comprises introducing (1) ammonia, (2) a compound selected from the group consisting of 1,2-dichloroethane, 1,2-dibromoethane, 1,2-dichloropropane, 1,2-dibromopropane, 1-chloro-2-bromoethane, 1-bromo-2-chloropropane and 1-chloro-2-bromopropane, and (3) a liquid organic polar compound of the formula

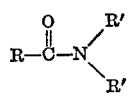

where R is hydrogen or alkyl, R' is alkyl, with the total number of carbon atoms being a maximum of 8, into a reaction zone; passing the reactor effluent into a contacting zone which contains a liquid hydrocarbon; removing unreacted ammonia from said contacting zone; removing the aziridine and liquid hydrocarbon from the

| Run No. | Promoter used | Wt. percent promoter in reaction mixture | Reaction temp. °C. | Reaction time, minutes | Percent, 1,2-dichloroethane converted | Ethylenimine per pass yield, percent |
|---|---|---|---|---|---|---|
| 1 | None | | 70 | 70 | 36 | 20 |
| 2 | Dimethylformamide | 16 | 70 | 70 | 50 | 23 |
| 3 | do | 28 | 70 | 70 | 51 | 25 | contacting zone; and separating aziridine from the liquid hydrocarbon.

5. The method of claim 1 wherein the promoter is dimethylformamide.

6. The method of claim 2 wherein the promoter is dimethylformamide.

7. The method of claim 4 wherein the liquid organic polar compound is dimethylformamide.

References Cited

UNITED STATES PATENTS 3,336,294  8/1967  Miller et al. _____ 260—239

FOREIGN PATENTS 649,353  9/1962  Canada.

OTHER REFERENCES

Parker: Quarterly Reviews, vol. 16, pp. 176–182 and 187 (1962). Q1Q9.

Patai et al.: J. Chem. Soc. (London), pp. 1035–1038.

ALTON D. ROLLINS, *Primary Examiner.*